United States Patent
Wu

(10) Patent No.: US 9,444,893 B2
(45) Date of Patent: Sep. 13, 2016

(54) NETWORK POWER CONTROL MODULE

(71) Applicant: Lai-Fu Wu, New Taipei (TW)

(72) Inventor: Lai-Fu Wu, New Taipei (TW)

( * ) Notice: Subject to any disclaimer, the term of this patent is extended or adjusted under 35 U.S.C. 154(b) by 721 days.

(21) Appl. No.: 13/927,083

(22) Filed: Jun. 25, 2013

(65) Prior Publication Data

US 2014/0195063 A1   Jul. 10, 2014

(30) Foreign Application Priority Data

Jan. 8, 2013   (TW) .............................. 102200333 U

(51) Int. Cl.
| | |
|---|---|
| *H04L 29/08* | (2006.01) |
| *H02J 5/00* | (2016.01) |
| *H04N 21/436* | (2011.01) |
| *H04L 12/28* | (2006.01) |
| *H04L 12/12* | (2006.01) |
| *G06F 1/26* | (2006.01) |
| *G06F 1/32* | (2006.01) |
| *H02J 13/00* | (2006.01) |
| *H02J 3/14* | (2006.01) |

(52) U.S. Cl.
CPC ............ *H04L 67/125* (2013.01); *G06F 1/266* (2013.01); *G06F 1/3209* (2013.01); *H02J 5/00* (2013.01); *H02J 13/0062* (2013.01); *H02J 13/0075* (2013.01); *H04L 12/12* (2013.01); *H04L 12/2818* (2013.01); *H04L 12/2825* (2013.01); *H04N 21/43615* (2013.01); *H02J 2003/143* (2013.01); *Y02B 70/3266* (2013.01); *Y04S 20/242* (2013.01)

(58) Field of Classification Search
CPC ...... G06F 1/263; G06F 1/266; G06F 1/3203; G06F 1/3209; G08C 17/02; G08C 2201/42; G08C 2201/91; H04L 12/10; H04L 12/12; H04L 12/2818; H04L 12/2825; H04L 67/125; H04N 21/43615; H02J 2003/143
See application file for complete search history.

(56) References Cited

U.S. PATENT DOCUMENTS

| | | | | |
|---|---|---|---|---|
| 7,409,566 | B1 * | 8/2008 | Diab ....................... | G06F 1/266 455/13.4 |
| 7,941,677 | B2 * | 5/2011 | Penning .................. | G06F 1/263 361/731 |
| 8,042,048 | B2 * | 10/2011 | Wilson ................ | H04L 12/2807 700/17 |
| 8,046,619 | B2 * | 10/2011 | Newland ................. | G06F 1/263 710/16 |
| 8,421,588 | B1 * | 4/2013 | Ross ....................... | G08C 17/02 340/5.1 |
| 8,558,413 | B1 * | 10/2013 | Lepard ................ | F21V 33/0052 307/150 |
| 8,712,558 | B2 * | 4/2014 | Ingels ..................... | G06F 1/266 700/22 |
| 2011/0164364 | A1 * | 7/2011 | Baum .................... | H04B 3/542 361/679.02 |
| 2012/0065802 | A1 * | 3/2012 | Seeber .................. | G06F 1/3203 700/295 |
| 2012/0271472 | A1 * | 10/2012 | Brunner ................ | G06F 1/3209 700/295 |
| 2013/0088095 | A1 * | 4/2013 | Martschitsch .......... | H04L 12/12 307/126 |

* cited by examiner

*Primary Examiner* — Crystal J Barnes-Bullock
(74) *Attorney, Agent, or Firm* — Leong C. Lei

(57) ABSTRACT

A network power control module includes a switch and a processor installed in at least one electronic device within an area. The switch is electrically coupled to a first external power supply and the electronic device, and the processor includes a communication module in electrical communication with a control device at a remote end via a router of the area for receiving a control signal and then switching the switch to output or stop outputting voltage of the first external power supply to the electronic device, so that users can control the electronic devices at a remote control freely without requiring complicated network configurations to facilitate the schedule management for household affairs and improve the users' comfortability and home security effectively.

8 Claims, 5 Drawing Sheets

NETWORK POWER CONTROL MODULE

CROSS-REFERENCE TO RELATED APPLICATIONS

This non-provisional application claims priority under 35 U.S.C. §119(a) on Patent Application No(s). 102200333 filed in Taiwan, R.O.C. on Jan. 8, 2013, the entire contents of which are hereby incorporated by reference.

BACKGROUND OF THE INVENTION

1. Field of the Invention

The present invention relates to the field of remote control equipments, and more particularly to a simple-structured multifunctional network power control module installed between mains electricity and an electronic device to allow users to control the operation of the electronic device and the operation status timely.

2. Description of the Related Art

To facilitate users to use a home electric appliance such as air conditioner, television and stereo, a dedicated remote control is bundled or a universal remote control device compatible to the electric appliances is provided for users to operate the electric appliance via wireless transmission. However, the remote control has a limited using distance, and the universal remote control has the drawbacks of complicated setup and little control functions, and thus the practicality is limited. As the communication technology advances, information appliances integrated with a communication function are introduced to the market continuously and provided for users to operate the electric appliances at a remote end via network or telephone in order to overcome the aforementioned problems. In general, the information appliances of this sort have built-in controller and communication device, and the controller uses the communication device to link to the Internet after connecting to a router at home via a cable or wireless network. In the meantime, a control program is installed into an electronic device such as a mobile phone, a tablet PC or a PDA and provided for the users to access the controller via the Internet to operate the electric appliances and monitor the operating status from a remote end, so as to facilitate the users to turn on a lamp to improve home security or a washing machine or rice cooker to expedite household management before arriving home, and also facilitate the users to turn off a power supply to prevent fire accident and save power after leaving home.

However, a corresponding updated management program must be installed in the electronic device in the aforementioned management system, when the users want to control a new model of electric appliance. There are various models and manufacturers of the information appliances, so that if each management program just allows its use for a particular model of the electric appliance or a particular manufacturer, a complicated pre-installation operation will be required, and these programs are unfavorable for management and use, so that the users' willingness of use will be reduced, and the consumer satisfaction will be lowered.

In view of the aforementioned problems, it is a main subject of the present invention to integrate the controller and the communication device into a control module to be installed into any information appliance by the users in order to have a consistent management capability for various electric appliances and improve the convenience of the management and the practical use of the electric appliance.

SUMMARY OF THE INVENTION

In view of the problems of the prior art, it is a primary objective of the present invention to provide a highly adaptive and scalable network power control module to facilitate users to control indoor electronic devices at home or in office from a remote end via network, so as to achieve the effects of improving the security, convenience and comfortability of the living and working environments.

To achieve the aforementioned objectives, the present invention provides a network power control module for at least one electronic device in an area, electrically coupled to a control device at a remote end via a router in the area for receiving a control signal transmitted from the control device to control the operating status of the electronic device. The network control module comprises a switch, a power supply and a processor. The switch is electrically coupled to a first external power supply and the electronic device, and the power supply is electrically coupled to the first external power supply for converting the AC voltage of the first external power supply into a DC operating voltage. The processor is in electrical communication with the switch and electrically coupled to the power supply for obtaining the operating voltage, and the processor comprises a communication module, for automatically connecting to the router via a wireless network or Ethernet and accessing an Internet Protocol (IP) address, wherein the processor supports at least one of the Universal Asynchronous Receiver/Transmitter (UART) interface, Universal Serial Bus (USB) interface, Audio interface and Voice over Internet Protocol (VoIP) function. When the processor receives the control signal through the communication module, the control signal is analyzed and divided into an operation request and operation data, and the switch is turned on or off according to the operation request to output a first external power source to the electronic device, or execute the operation data through the UART interface, the USB interface, and the Audio interface and the VoIP function according to the operation request.

In addition, the communication module has a wireless access point function and supports at least one of the Wi-Fi Protected Setup (WPS) and Dynamic Host Configuration Protocol (DHCP) function to expand the wireless network range in the area. When plural electronic devices are used and controlled in groups, one of the communication modules has a group list, so that when a search signal transmitted from another communication module is received, the communication module is compared with the group list to feed back an acknowledge signal and automatically connect the other communication module and let the control device have the capability of providing a one-time reading and controlling the operating status of the electronic devices of the same group.

Wherein, the network power control module further comprises an AC/DC converter and a power switch, and the AC/DC converter is electrically coupled to the first external power supply for converting AC voltage of the first external power supply into a DC voltage, and an end of the power switch is electrically coupled to the AC/DC converter, and a trigger end of the power switch is in electrical communication with the processor to facilitate the processor to output the DC voltage from another end of the power switch or stop outputting the DC voltage according to the operation request when the power switch is switched. An end of the power switch is electrically coupled to an external power converter, and the external power converter is electrically coupled to a second external power supply, such that the voltage of the second external power supply can be converted into the DC voltage to improve the stability of the power supply.

To take the using habits of different users into consideration, at least one wall switch is installed in the area and electrically coupled between the first external power supply and the electronic device, between both ends of the switch or between the first external power supply and the power supply, such that when the switch is turned off to allow outputting the first external power to the electronic device, the wall switch can be used to control the power supply status of the electronic device.

In summation of the description above, the present invention uses a router at home or in office to connect the intranet of the area and allows users to control the electric power of the electronic device from a personal terminal such as a mobile phone, computer or PDCA at a remote end and centralize the management of devices, so as to facilitate users to build a schedule management system for daily affairs.

DETAILED DESCRIPTION OF THE PREFERRED EMBODIMENTS

The technical content of the present invention will become apparent with the detailed description of preferred embodiments and the illustration of related drawings as follows.

Figure 1:
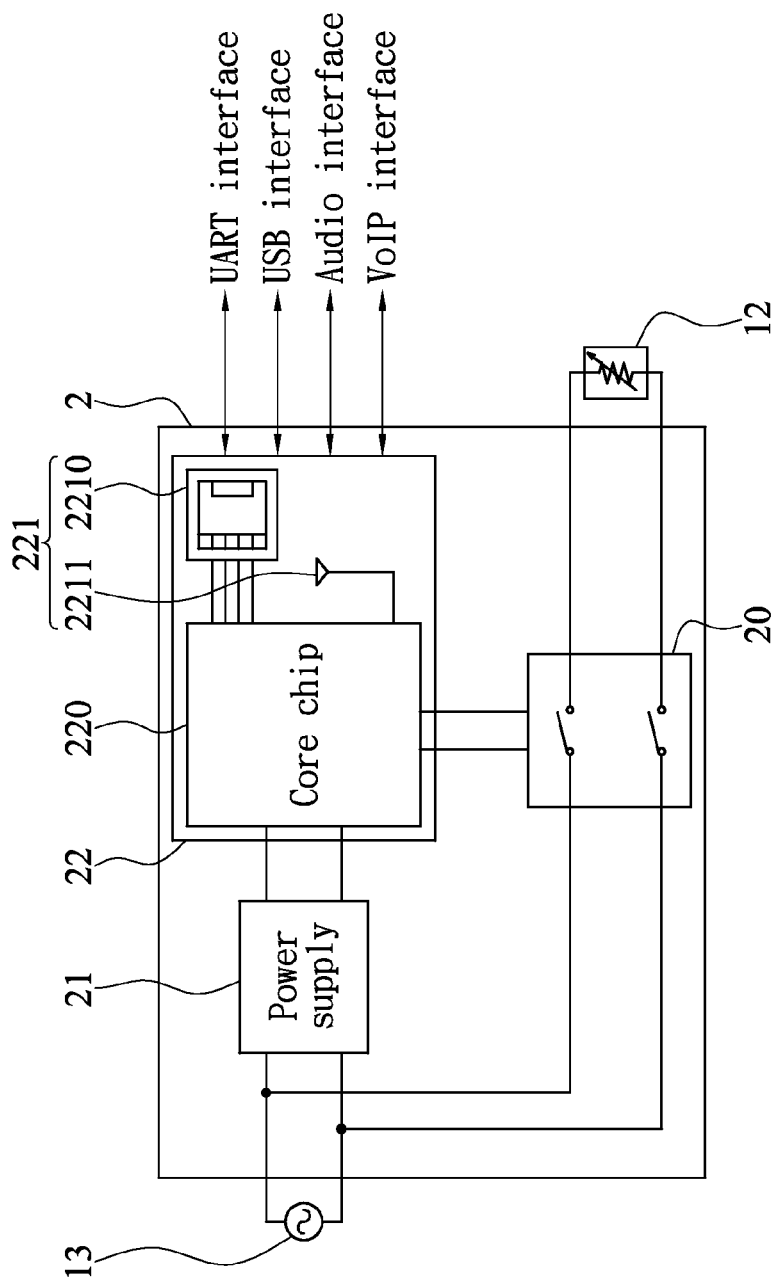
FIG. 1 is a block diagram of a first preferred embodiment of the present invention.
Figure 2:
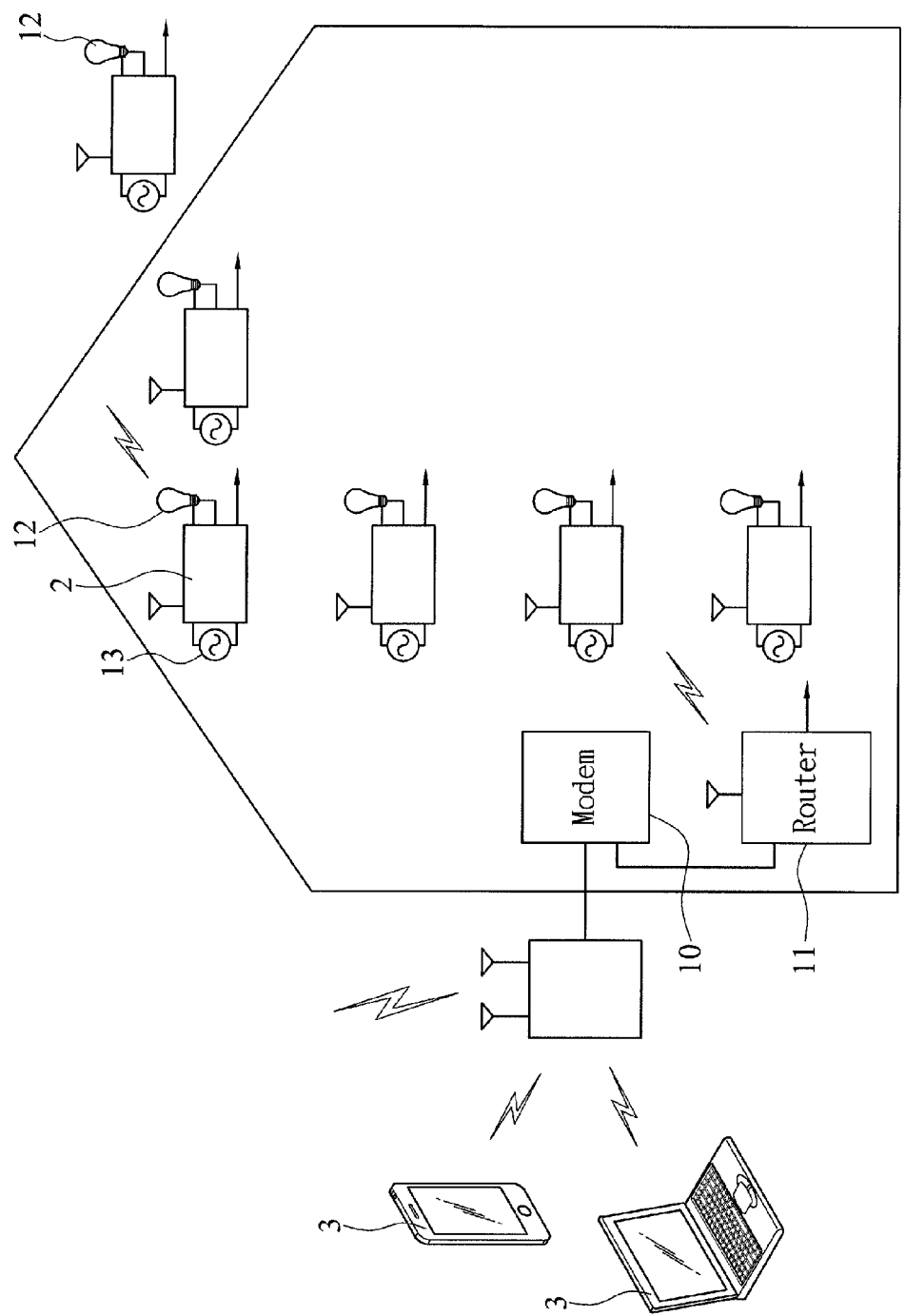
FIG. 2 is a schematic view of an application of the first preferred embodiment of the present invention.
Figure 3:
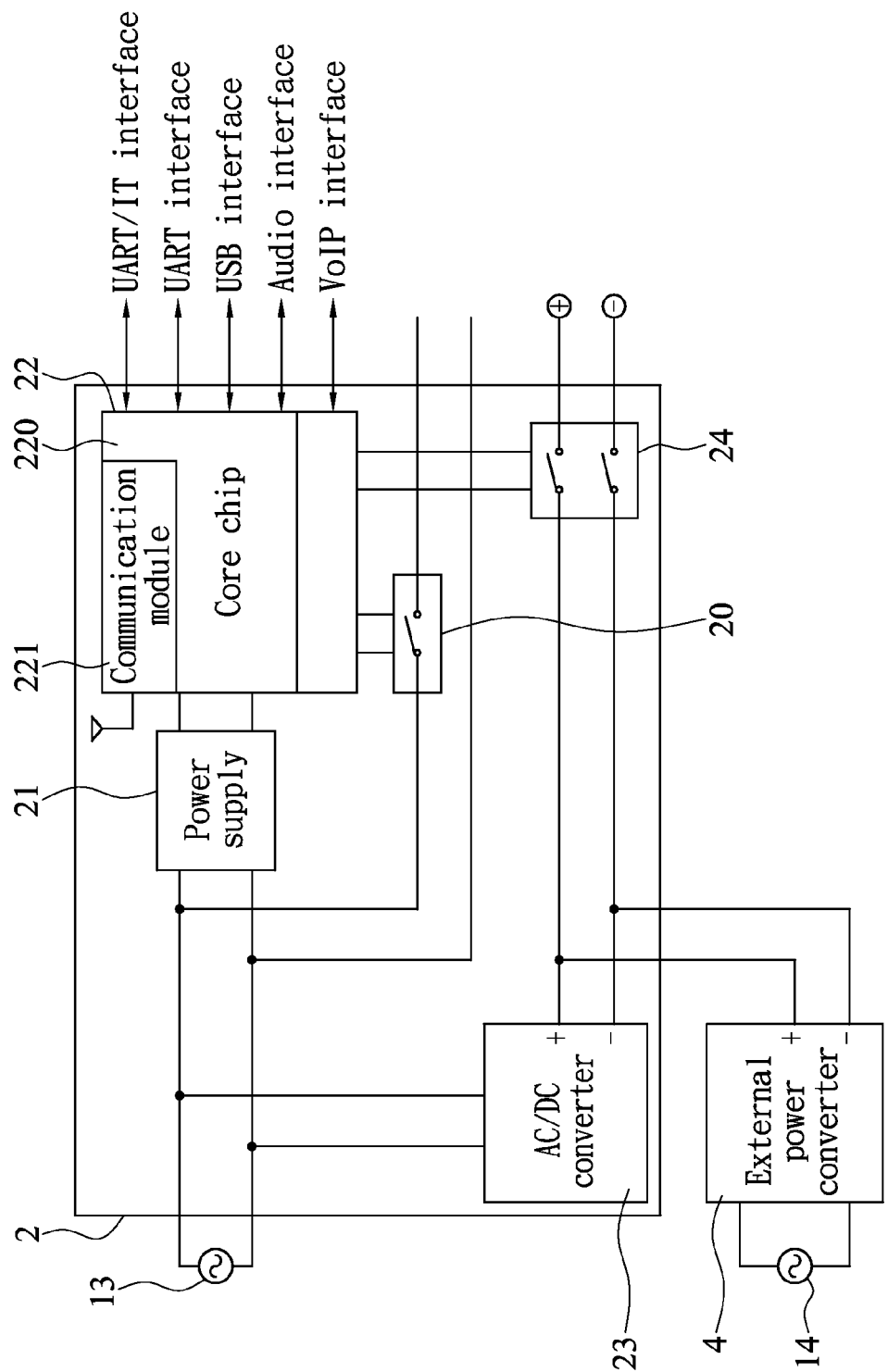
FIG. 3 is a block diagram of a second preferred embodiment of the present invention.

With reference to FIGS. 1 to 3 for block diagrams and a schematic view of an application of different embodiments of the present invention, when an ADSL circuit is installed in an area such as a residential area, a courtyard or an office, computers can be connected to the internet via a modem 10 with a connected telephone line, or a cable or wireless router 11 is installed to establish an intranet, such that at least one electronic device 12 such as an LED lamp, a camera, a computer, a display or a television in an area can be connected with each other while linking to the internet. The network power control module 2 is an independent module comprising a switch 20, a power supply 21, a processor 22, an AC/DC converter 23 and a power switch 24, so that manufacturers can assemble the network power control module 2 into the electronic device 12 directly, and users can purchase the network power control module 2 to be installed between any electronic device 12 and a power supply. Users at different locations can install a control device 3 such as a mobile phone, a computer or a PDA with a corresponding program to send a control signal monitor via ISP to monitor the operating status of the electronic device 12.

The switch 20 can be a relay, a silicon controlled rectifier (SCR) or a TRI-electrode AC switch (TRIAC), and an end of the switch 20 is electrically coupled to a first external power supply 13, and the other end of the switch 20 is electrically coupled to the electronic device 12, and a trigger end is in electrical communication with the processor 22. The power supply 21 is electrically coupled to the first external power supply 13 and the processor 22 for converting AC voltage of the first external power supply 13 into a 12V DC operating voltage to be transmitted to the processor 22. The processor 22 includes a core chip 220 and a communication module 221 and supports at least one of the UART interface, USB interface, Audio interface and VoIP function, and the communication module 221 can be an Ethernet control chip 2210, a 2.4G wireless network (Wi-Fi) control chip 2211 or a combination of the above that supports cable or wireless network transmissions. When the processor 22 obtains the control signal from the communication module 221 and analyzes the control signal to produce an operation request and operation data, the switch 20 is triggered to start or stop outputting the first external power supply 13 to the electronic device 12 according to the operation request, or execute operation data via the UART interface, the USB interface, the Audio interface or the VoIP function according to the operation request. Therefore, the control device 3 transmits file data to the electronic device 12 via the network power control module 2 for storage and backup or transmits video data to the electronic device 12 for playing the video data, so as to provide a value-added function to the electronic device 12 and improve the practicality. Furthermore, the users can set the operation schedule of each electronic device 12 through a management program, such that after the control device 3 is connected to the router 11 via network, the operating status of the electronic device 12 can be switched for turning on or off a power supply, adjusting the brightness of LED lamps, or setting a video mode of video cameras, etc.

Figure 4:
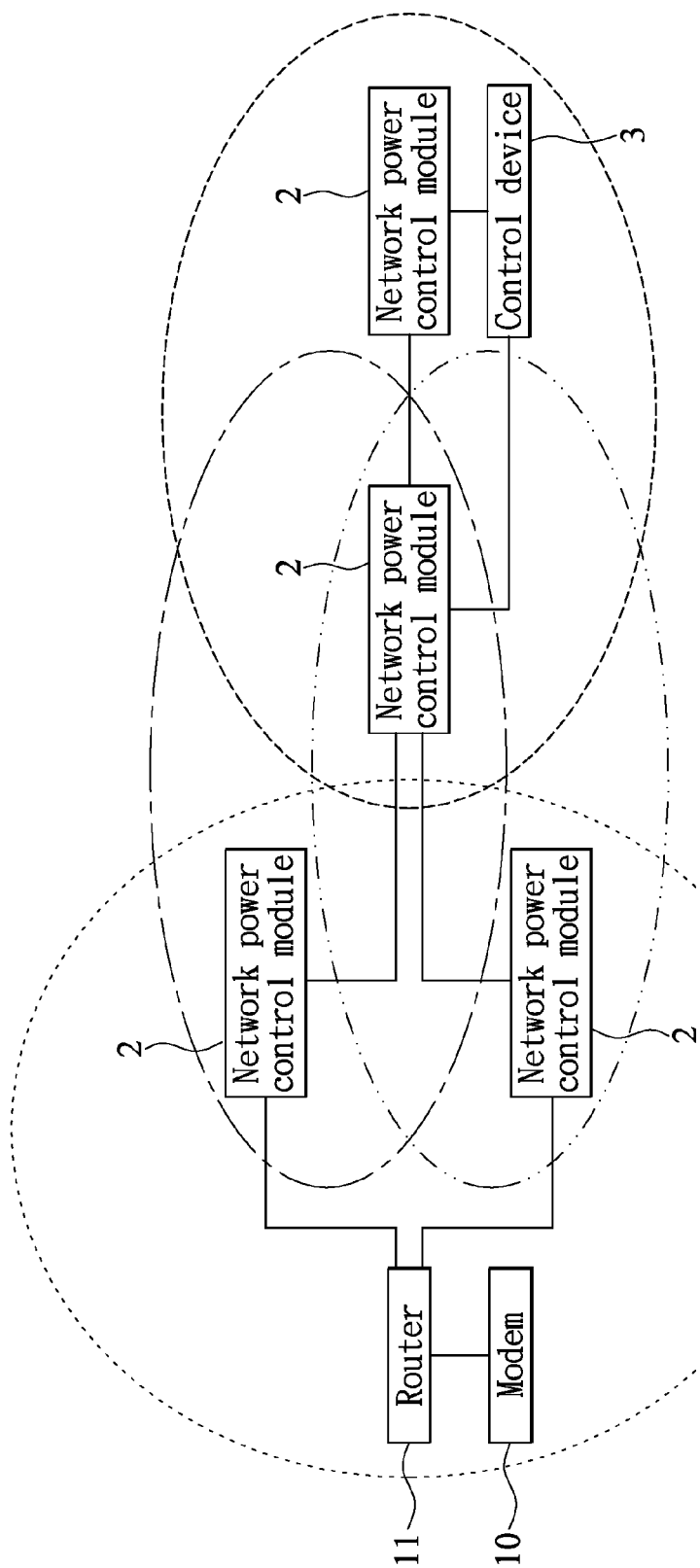
FIG. 4 is a schematic view of an application of the second preferred embodiment of the present invention.

In this preferred embodiment, the processor 22 can perform a self test and compile the operating status of the power supply 21, so that users can read the power using status from the control device 3 for switch the operating status of the electronic device 12 when there is an abnormal power condition. When the temperature of the processor 22 is greater than a safety value or abnormal, or the external power supply suddenly has a large voltage difference, the switch 20 can be turned on directly to stop outputting the voltage of the first external power supply 13 to the electronic device 12 in order to protect related circuits and components. In addition, the communication module 221 has a wireless access point function and supports at least one of Wi-Fi Protected Setup (WPS) and Dynamic Host Configuration Protocol (DHCP) function. With reference to FIG. 4 for the related operation, the router 11 is connected automatically via Wi-Fi or Ethernet to obtain an IP address for receiving the control signal while achieving the effect of expanding the wireless network range in the area. When plural electronic devices 12 are used and controlled in groups, one of the communication modules 221 has a group list stored therein, such that, during installation, a search signal transmitted from another communication module 221 is received and compared with the group list to feed back an acknowledge signal and automatically connect to another communication module 221, so that the control device 3 has the capability of providing a one-time reading and controlling the operating status of the electronic devices 12 of the same group.

In addition, the AC/DC converter 23 is electrically coupled to the first external power supply 13 to convert AC voltage of the first external power supply 13 into DC voltage, and an end of the power switch 24 is electrically coupled to the AC/DC converter 23, and a trigger end of the power switch 24 is in electrical communication with the processor 22, so that the processor 22 can start or stop outputting the DC voltage from the other end when the processor 22 switches the power switch 24 according to the operation request. Therefore, the network power control module of the present invention serves as a transformer to provide a DC voltage source of a voltage value to facilitate users to adjust the position of setting the electronic device 12 in the area. The invention has multifunctional functions and economic values.

Figure 5:
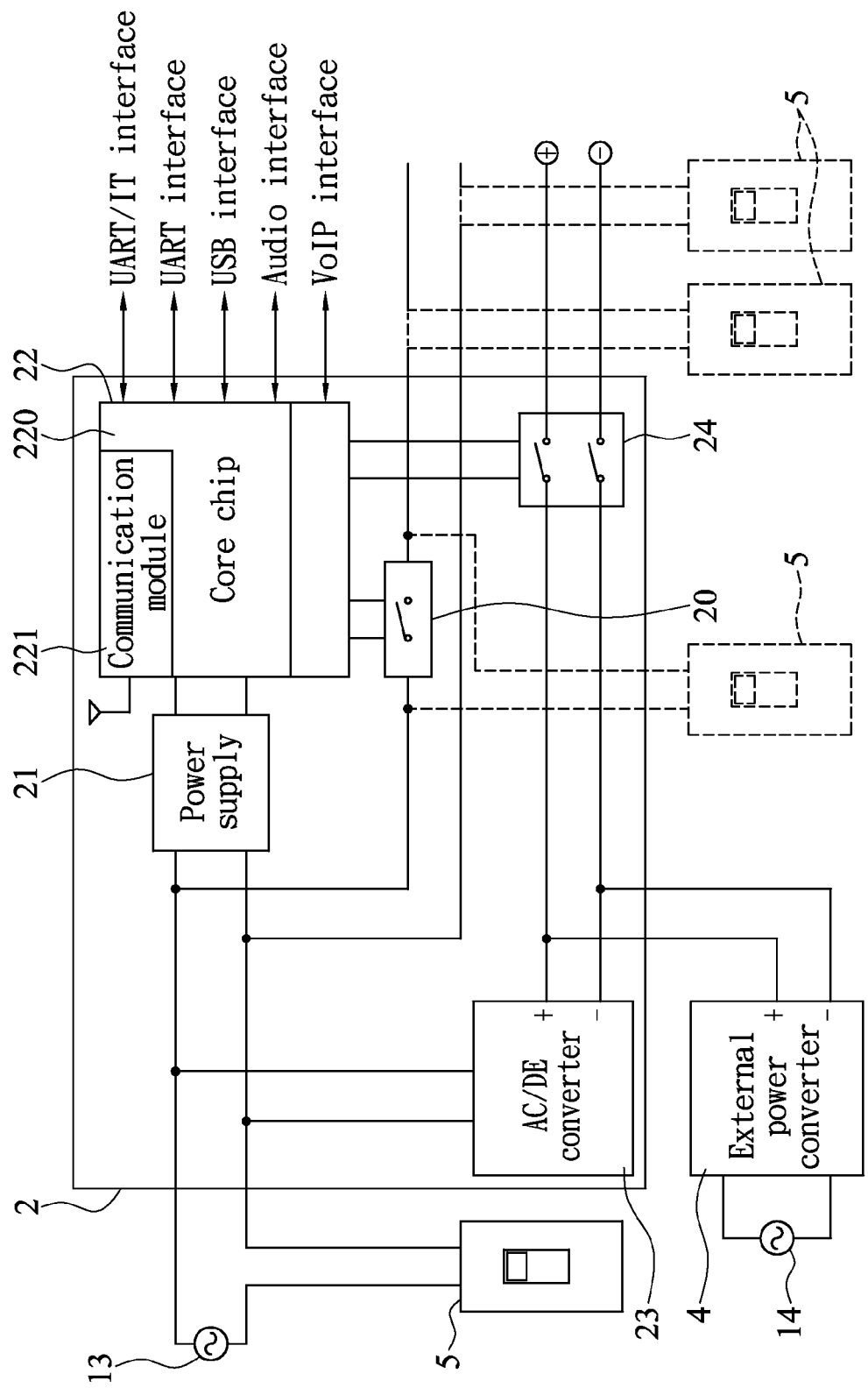
FIG. 5 is a block diagram of a third preferred embodiment of the present invention.

In the network power control module 2 as shown in FIG. 5, an end of the power switch 24 is electrically coupled to an external power converter 4, and the external power converter 4 is electrically coupled to a second external power supply 14 to allow users to convert the voltage of the second external power supply 14 into DC voltage, so as to improve the stability of the power supply. In general, at least one wall switch 5 is installed in the area, so that user can switch the power supply status of the electronic device 12 directly when the network power control module 2 is not installed or not turned on. When the users install the network power control module 2, the wall switch 5 is electrically coupled between the first external power supply 13 and the power supply 21, or between both ends of the switch 24, or between the first external power supply 13 and the electronic device 12 for switching the conduction or a cut-off status of a fire line or a ground line to control the power supply status of the electronic device 12 by using the wall switch 5 when the switch 20 is turned off and allows the first external power supply 13 to output voltage to the electronic device 12.

What is claimed is:

1. A network power control module, installed in at least one electronic device within an area, and in electrical communication with a control device at a remote end through a router in the area, for receiving a control signal transmitted from the control device to control the operating status of the electronic device, comprising:
   a switch, electrically coupled to a first external power supply and the electronic device;
   a power supply, electrically coupled to the first external power supply for converting an AC voltage of the first external power supply into a DC operating voltage; and
   a processor, in electrical communication with the switch, and electrically coupled to the power supply, for accessing the operating voltage, and the processor having a communication module for automatically connecting the router during the operation and automatically obtaining an internet protocol (IP) address via a wireless network or an Ethernet, wherein the processor supports at least one of the Asynchronous Receiver/Transmitter (UART) interface, Universal Serial Bus (USB) interface, Audio Interface and Voice over Internet Protocol (VoIP) function, such that when the processor receives the control signal through the communication module, the control signal is analyzed to produce an operation request and operation data to trigger the switch to be turned on or off to output the first external power supply to the electronic device according to the operation request, or execute the operation data through the Asynchronous Receiver/Transmitter (UART) interface, the Universal Serial Bus (USB) interface, the Audio Interface or the Voice over Internet Protocol (VoIP) function according to the operation request.

2. The network power control module of claim 1, wherein the communication module has a wireless access point function, and supports at least one of the Wi-Fi Protected Setup (WPS) and Dynamic Host Configuration Protocol (DHCP) functions to expand the wireless network range in the area.

3. The network power control module of claim 2, wherein one of the communication modules has a group list stored therein when plural electronic devices are used and controlled in groups, such that when a search signal transmitted from another communication module is received, the communication module is compared with the group list to feed back an acknowledge signal and automatically connecting the other communication module and allow the control device to have the capability of providing a one-time reading and controlling of the operating status of the electronic devices of the same group.

4. The network power control module of claim 1, further comprising an AC/DC converter and a power switch, and the AC/DC converter is electrically coupled to the first external power supply to convert an AC voltage of the first external power supply into a DC voltage, and an end of the power switch is electrically coupled to the AC/DC converter, and an trigger end of the power switch is in electrical communication with the processor for outputting or stopping outputting the DC voltage from the other end of the power switch when the processor switches the power switch according to the operation request.

5. The network power control module of claim 4, wherein the power switch has an end electrically coupled to an external power converter, and the external power converter is electrically coupled to a second external power supply for converting the voltage of the second external power supply into the DC voltage to improve the stability of the power supply.

6. The network power control module of claim 4, wherein the area has at least one wall switch electrically coupled between the first external power supply and the electronic device for controlling the power supply status of the electronic device by using the wall switch when the switch is turned off to allow outputting the first external power supply to the electronic device.

7. The network power control module of claim 4, wherein the area has at least one wall switch electrically coupled to both ends of the switch for controlling the power supply status of the electronic device by using the wall switch when the switch is turned off to allow outputting the first external power supply to the electronic device.

8. The network power control module of claim 4, wherein the area has at least one wall switch electrically coupled between the first external power supply and the power supply for controlling the power supply status of the electronic device by using the wall switch when the switch is turned off to allow outputting the first external power supply to the electronic device.

* * * * *